G. R. BABBITT.
Machines for Winding Fabrics.

No. 153,212.    Patented July 21, 1874.

WITNESSES.    INVENTOR.

UNITED STATES PATENT OFFICE.

GEORGE R. BABBITT, OF PROVIDENCE, RHODE ISLAND.

IMPROVEMENT IN MACHINES FOR WINDING FABRICS.

Specification forming part of Letters Patent No. 153,212, dated July 21, 1874; application filed May 16, 1874.

*To all whom it may concern:*

Be it known that I, GEORGE R. BABBITT, of the city and county of Providence, in the State of Rhode Island, have invented a new and useful Improvement in Machines for Winding Fabrics, &c., on Paper Rolls; and I do hereby declare that the following specification, taken in connection with the drawings making a part of the same, is a full, clear, and exact description thereof.

Figure 1:
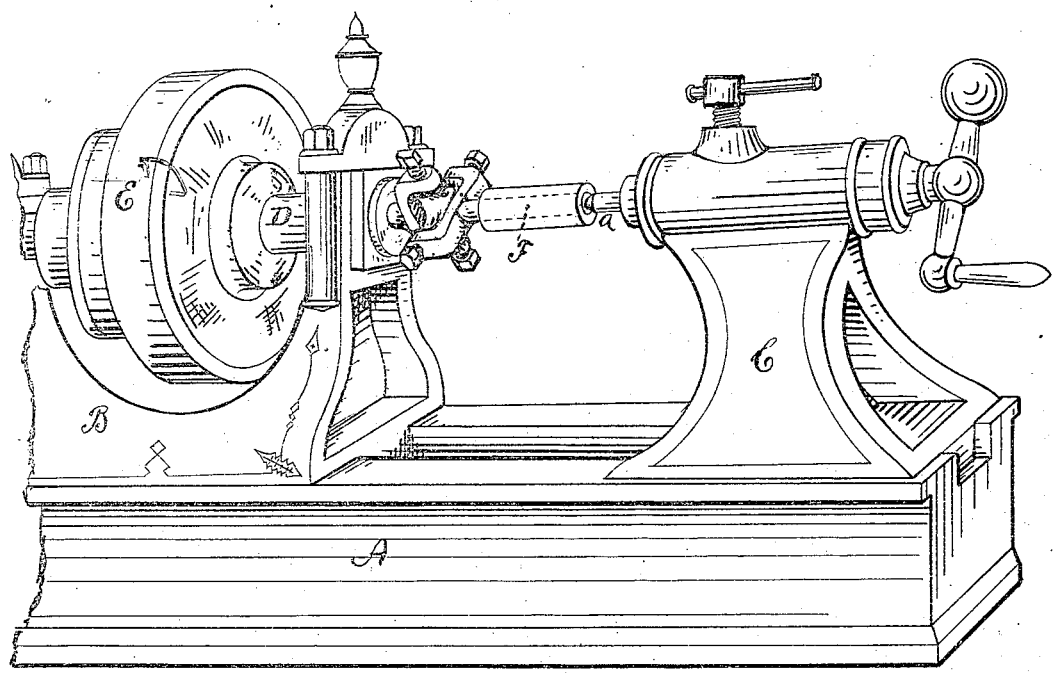
Figures 2, 3:
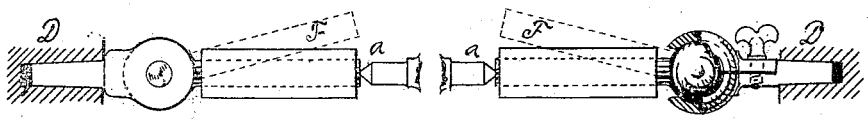

Figure 1 is a view of the machine in perspective. Figs. 2 and 3 are details, showing different forms of hinges for connecting the arbor with the head-stock.

Formerly various descriptions of fabrics, as cambrics, silesias, and jaconets, were put upon the market for sale wound in rolls upon solid cylindrical wooden cores. Recently hollow cylindrical cores made from pasteboard have come into use.

The object of my invention is to provide a machine which can be used for winding fabrics upon such paper cores or shells with rapidity and convenience.

The novelty of the machine resides in the combination of an arbor to receive the paper core with the head and tail stock of a lathe, the said arbor being jointed to the revolving spindle of the head-stock.

In the drawing, A is a bed; B, a head-stock; C, a tail stock with its tail-rest spindle *a;* and D a revolving spindle driven by a pulley, E, on the same, substantially as found in ordinary lathes for turning wood or iron. F is an arbor, which is made preferably of metal, and is connected with the spindle D by means of a ball-and-socket or other preferred form of joint, so that its longitudinal axis shall, when the machine is engaged in winding, coincide with the axes of the spindles D and *a*. The other end of the arbor is centered, and the pointed spindle of the tail-rest is to be entered therein. The purpose of this jointed connection of the arbor to the spindle is to enable the attendant to swing at pleasure the arbor out of coincidence with the axes of the spindles of the stock, so as to be able to place easily thereon, or remove therefrom, a paper core which is to be wound with cloth or other material.

By this improvement the operation of winding the lengths of fabric can be performed with great rapidity, the only manipulation necessary to put the machine into condition for receiving a core, or discharging a wound roll, being the disengagement of the tail-rest spindle and the swinging of the front end of the arbor toward the attendant.

I am aware that hinged spindles have heretofore been used in bow-fliers and in cop-winding machines, and I therefore make no claim thereto.

What I claim as my invention, and desire to secure by Letters Patent, is—

In a cloth-winding machine adapted to wind fabrics on hollow cores or shells, the combination of the revolving spindle D, the revolving shell-carrying arbor F jointed to the spindle, and the tail-rest *a*, substantially as described.

GEO. R. BABBITT.

Witnesses:
O. L. BOSWORTH,
JOHN B. GRINNELL.